July 23, 1963 W. L. TRAFTON 3,098,274

MOLDING FASTENER

Original Filed Dec. 3, 1958

Inventor:
Warren L. Trafton,
by Walter S. Jones
Atty.

United States Patent Office 3,098,274

Patented July 23, 1963

1

2

3,098,274

MOLDING FASTENER

Warren L. Trafton, Grosse Pointe, Mich., assignor to United-Carr Fastener Corporation, Cambridge, Mass., a corporation of Delaware Continuation of application Ser. No. 777,942, Dec. 3, 1958. This application May 26, 1961, Ser. No. 116,643

3 Claims. (Cl. 24—73)

My invention aims to provide an improved fastener for moldings and the like.

An object of my invention is to provide a simple, inexpensive fastner that may be easily applied to and removed from a molding and may be attached to a support by means of a nut for positive assembly.

A further object of my invention is to provide a fastener preferably formed from a single piece of wire and having a suitably shaped molding engaging and holding portion, and preferably an unthreaded shank extending from the molding engaging portion and adapted to receive a self-threading nut.

Figure 1:
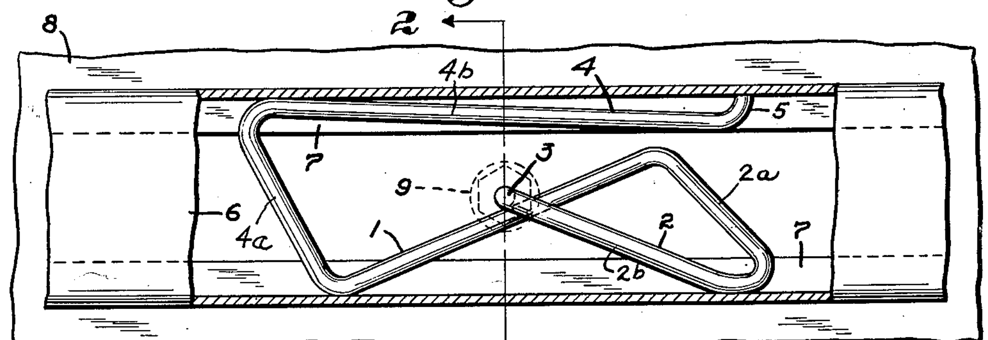
FIG. 1 is a plan view showing a preferred form of fastener in a molding, the molding being shown as partially broken and attached to a support.
Figure 3:
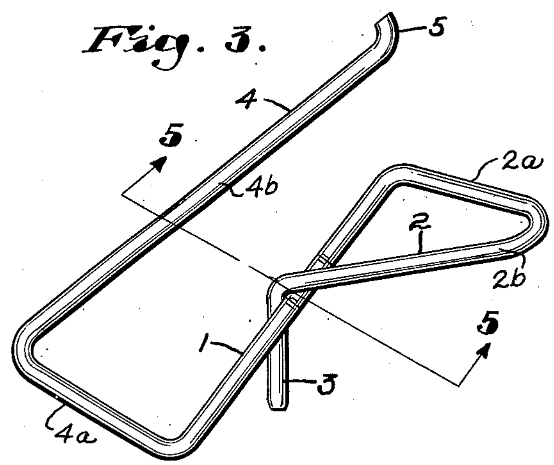
FIG. 3 is a perspective view of my improved molding fastener.
Figure 4:
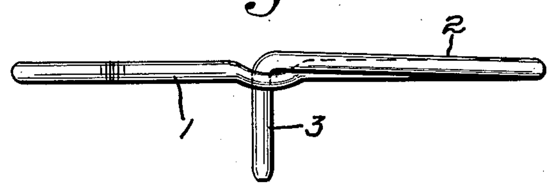
FIG. 4 is an edge view of the fastener.
Figure 5:
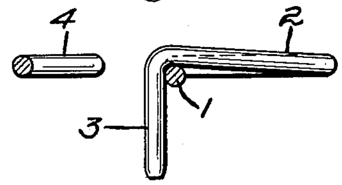
FIG. 5 is a section of the fastener taken on the line 5—5 of FIG. 3.

With reference now to the specific embodiment of my invention illustrated in the drawings, I have shown a fastener preferably formed from a single piece of wire, bent to provide a molding engaging and holding portion having a diagonal arm 1. At an end of the diagonal arm 1, I have bent the wire into a loop or arm 2 that crosses over the diagonal arm 1 and then extends at an angle normal to the plane of the molding engaging portion to provide a nut receiving shank 3. As illustrated in FIG. 3, the loop or arm 2 has a first arm portion *2a* united at one end to one end of the diagonal member 1 in angled relationship therewith. A second arm portion *2b* is united at one end to the other end of the first arm portion in angled relationship therewith forming a reverse bent portion which will engage one of the flanges 7 of the molding 6, as shown in FIG. 1. The second arm portion *2b* extends across the diagonal arm 1 adjacent its midpoint and is bent thereover to form the shank 3, which lies in substantially right angle relationship to the plane of the diagonal arm 1. At the other end of the diagonal portion 1, the wire is bent into a yieldable arm 4 having its free end hooked to provide an end portion 5 extending outwardly in the same plane as and away from the body of the fastener, the end of which may dig into the molding and provide a brake against accidental movement.

As illustrated in FIG. 3, the yieldable arm 4 is generally L-shaped in configuration and includes a first arm portion *4a* united at one end to the opposite end of the diagonal arm 1 in angular relationship and extending therefrom in a direction opposite to that of the first arm portion *2a* of the loop 2. The arm portion *4a* possesses a length greater than the lateral width of the molding 6. This arrangement produces an angled bearing portion which will engage the same flange 7 of the molding 6 as the reverse bent portion of the loop 2 but in laterally spaced relationship, as shown in FIG. 1. A second arm portion *4b* is united at one end to the other end of the first arm portion *4a* and extends therefrom in angled relationship thereto. The free end of the second arm portion *4b* is bent outwardly, forming the hook portion 5. As shown in FIG. 1, the free end of the hook portion 5 engages within the flange 7 of the molding 6 opposite to the other flange 7, and will result in the second arm portion *4b* being in inclined relationship. This arrangement produces a bearing portion for the second arm *4b* immediately adjacent its union with the first arm portion *4a* for engagement with the flange 7 in laterally spaced relation to the hook portion 5.

It should be understood that the shape of the molding engaging portion of my fastener may be varied to meet the shape of the molding. It should also be understood that the fastener may be attached to the molding by sliding it into position from one end, or it may be located at any desired position along the molding by insertion between the inturned flanges thereof.

Figure 2:
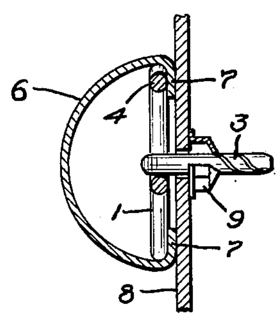
FIG. 2 is a section taken on the line 2—2 of FIG. 1.

The molding assembly shown in FIGS. 1 and 2 includes a hollow molding 6 with inturned flanges 7—7 so that when the fastener is in assembly the molding engaging and holding portion rests upon the flanges 7—7 (FIG. 1), and the portion 5 of the hooked end digs into the molding to prevent accidental sliding.

As seen in FIG. 1, the fastener has two longitudinally spaced bearing points along one side formed by the jointure of arm portions *2a* and *2b* and the jointure of arm portion *4a* with the diagonal arm 1 respectively, for engaging one side of the molding 6. The arm portion *4a* of the arm 4 engages the opposite side of the molding 6 at the jointure point of one end of the arm portion *4b* with the arm portion *4a*, and at the end portion *5a* at the other end of the arm *4b*. Such a construction defines four points of rectilinear contact or support for the fastener with the molding. It is readily apparent that if the end portion 5 is omitted, the arm portion *4b* will be substantially in engagement throughout its length with one side edge of the molding.

When the assembly is completed (FIG. 2), the shank 3 passes through a hole in a support 8 and a nut 9 is threaded onto the shank tightly against the underside of the support 8.

The shank 3 is preferably free of any preformed thread and is soft so that a self-threading nut (as illustrated) may thread its own way onto the shank.

It is desirable to have the molding engaging portion of the fastener tempered to provide the proper spring tension. Therefore, the molding engaging portion may be heat treated while the shank is kept from being heat treated, or the whole fastener part may be heat treated and the shank portion thereafter annealed by any suitable process.

This application is a continuation of my application Serial No. 777,942, filed December 3, 1958, and now abandoned.

While I have illustrated and described a preferred construction of my improved molding fastener, it should be understood that my invention is best defined by the following claims.

I claim:

1. A one-piece wire fastener device for securing molding and the like to a support which comprises a molding-engaging and holding member having a diagonal portion, a loop-like arm portion connected to one end of said diagonal portion and extending therefrom in angular relationship therewith, said loop-like portion including a reverse bent portion spaced from its jointure point with said diagonal portion for engagement with one side edge of the molding, said loop-like portion further including a portion bent over said diagonal portion substantially centrally thereof with the bent portion extending in a plane normal to the plane of the molding-engaging and holding member to provide a shank portion for passage through an opening in the support, said shank portion adapted to receive means thereon for attaching same to a support, and a yieldable arm member generally L-shaped in configuration connected to the other end of said diagonal portion, said yieldable arm member including a first arm portion of a length greater than the length of said loop-like portion connected at one end to the other end of said diagonal portion and extending therefrom in angular relationship therewith and in a direction opposite to that of said loop-like portion and forming a bearing portion lying in substantially the same plane as but laterally spaced from said reverse bent portion of said loop-like portion for engagement with the same side edge of the molding as the reverse bent portion of said loop-like arm portion but in laterally spaced relationship thereto, and a second arm portion secured at one end to the other end of said first arm portion in angled relationship therewith, said second arm portion lying in the same plane as and extending in a direction toward the jointure point of said diagonal portion and said loop-like arm portion but in spaced relation thereto for engaging the opposite side edge of the molding to provide a flexible molding-engaging pressure arm to maintain the fastener device in tensioned position within the molding.

2. A one-piece wire fastener device in accordance with claim 1 in which the free end of the second arm of the yieldable arm member is provided with a bent bearing arm portion extending in a direction away from the jointure point of the diagonal arm portion and the loop-like arm portion to engage the same side of the molding as the second arm portion.

3. A one-piece fastener device for securing molding and the like to a support which comprises an elongated yieldable arm portion, a first arm portion secured to one end of said yieldable arm portion in angled relationship therewith forming a bearing portion for engagement with one side of the molding, a molding-engaging bent portion secured to the other end of said yieldable arm portion for engaging the same side of the molding as the formed bearing portion but in laterally spaced relation thereto, a central arm portion secured at one end to the other end of said first arm portion and extending therefrom in inclined relation to and in the general direction of said yieldable arm portion thereby forming a second bearing portion for engaging the opposite side edge of the molding, a third arm portion secured at one end to the other end of said central arm portion and extending away therefrom in angled relationship thereto in a general direction opposite to the direction of said first arm portion, said third arm portion being of a length less than said first arm portion, whereby said yieldable arm portion may be flexed inwardly in a direction toward said third arm portion to maintain the fastener device in tensioned position within the molding, and a fourth arm portion connected at one end to the other end of said third arm portion and extending therefrom in angled relationship therewith in a direction toward said central arm portion thereby forming a third bearing portion for engaging with the same side of the molding as the formed second bearing portion but in laterally spaced relation thereto, the free end of said fourth arm portion being bent over said central arm portion in substantially right angular relationship therewith to form a shank portion, said shank portion adapted to receive means thereon for attaching same to a support.

References Cited in the file of this patent

UNITED STATES PATENTS

| | | |
|---|---|---|
| 2,229,708 | Tinnerman | Jan. 28, 1941 |
| 2,879,569 | Poupitch | Mar. 31, 1959 |
| 2,894,301 | Scott | July 14, 1959 |
| 2,910,750 | Scott | Nov. 3, 1959 |